US008260322B2

(12) United States Patent
Allen et al.

(10) Patent No.: US 8,260,322 B2
(45) Date of Patent: Sep. 4, 2012

(54) METHOD FOR LOCATING COVERAGE GAPS IN WIRELESS COMMUNICATION SERVICES

(75) Inventors: Thomas R. Allen, San Mateo, CA (US); Anil Tiwari, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 993 days.

(21) Appl. No.: 11/058,113

(22) Filed: Feb. 15, 2005

(65) Prior Publication Data
US 2006/0183487 A1 Aug. 17, 2006

(51) Int. Cl.
*H04W 24/00* (2009.01)
(52) U.S. Cl. ............... 455/456.5; 455/456.1; 455/423; 455/67.11; 455/41.2
(58) Field of Classification Search ............... 455/67.13, 455/67.11, 423–425, 456.1–457, 41.2; 342/457; 340/995.17; 379/32.01; 701/117
See application file for complete search history.

(56) References Cited

U.S. PATENT DOCUMENTS

| | | | | |
|---|---|---|---|---|
| 4,814,711 A * | 3/1989 | Olsen et al. | ................. | 324/331 |
| 5,023,900 A * | 6/1991 | Tayloe et al. | ............... | 379/32.01 |
| 5,189,734 A * | 2/1993 | Bailey et al. | ................... | 455/438 |
| 5,235,633 A * | 8/1993 | Dennison et al. | ......... | 455/456.3 |
| 5,481,588 A | 1/1996 | Rickli et al. | | |
| 5,715,516 A * | 2/1998 | Howard et al. | ............ | 455/422.1 |
| 6,266,514 B1 * | 7/2001 | O'Donnell | ................. | 455/67.13 |
| 6,400,690 B1 | 6/2002 | Liu et al. | | |
| 6,594,576 B2 | 7/2003 | Fan et al. | | |
| 6,636,737 B1 * | 10/2003 | Hills et al. | ..................... | 455/450 |
| 6,665,521 B1 * | 12/2003 | Gorday et al. | ............. | 455/67.11 |
| 6,721,572 B1 * | 4/2004 | Smith et al. | ................ | 455/456.1 |
| 6,745,011 B1 * | 6/2004 | Hendrickson et al. | ..... | 455/67.11 |
| 6,766,361 B1 | 7/2004 | Venigalla | | |
| 6,799,047 B1 * | 9/2004 | Bahl et al. | ................. | 455/456.1 |
| 6,915,128 B1 * | 7/2005 | Oh | ................ | 455/424 |
| 6,925,378 B2 * | 8/2005 | Tzamaloukas | ................ | 701/200 |
| 7,065,351 B2 * | 6/2006 | Carter et al. | .................. | 455/423 |
| 7,293,088 B2 * | 11/2007 | Douglas et al. | ............... | 709/224 |
| 7,603,115 B2 * | 10/2009 | Banavar et al. | ............... | 455/421 |
| 7,630,707 B2 * | 12/2009 | Lee et al. | ...................... | 455/421 |
| 2002/0029108 A1 | 3/2002 | Liu et al. | | |
| 2003/0061009 A1 | 3/2003 | Davis et al. | | |

(Continued)

FOREIGN PATENT DOCUMENTS
EP 0 431 956 A3 7/1900
(Continued)

OTHER PUBLICATIONS
Search Report for EP Application No. GB0602940.9, 4 pages.

*Primary Examiner* — Sharad Rampuria

(57) ABSTRACT

A method for determining coverage gaps within a geographical area served by a wireless communication network includes: (a) receiving a location report from each of a plurality of mobile units; (b) storing all location reports received from the mobile units in a database; and (c) searching the database for a position within the geographical area at which an acceptable quality wireless signal has not been received. The location report may include a measured signal quality metric of the wireless link, which may be the signal strength of the wireless link, a bit error rate of the wireless link, or both. Location reports may be displayed on a map to show coverage quality and gaps. Statistical technique and quantitative techniques can be applied on the signal quality metrics reported.

37 Claims, 5 Drawing Sheets

U.S. PATENT DOCUMENTS

| | | |
|---|---|---|
| 2004/0152362 A1 | 8/2004 | Carter et al. |
| 2004/0203718 A1* | 10/2004 | Knauerhase et al. ......... 455/423 |
| 2007/0087738 A1* | 4/2007 | Melkesetian .............. 455/422.1 |
| 2010/0248640 A1* | 9/2010 | MacNaughtan et al. ... 455/67.11 |

FOREIGN PATENT DOCUMENTS

| | | |
|---|---|---|
| EP | 1 081 972 A3 | 8/2000 |
| EP | 1081972 | 4/2002 |
| EP | 1210832 | 10/2003 |
| GB | 2 166 325 A | 4/1986 |
| GB | 2 406 472 A | 3/2005 |
| GB | 2 416 271 A | 1/2006 |
| GB | 2 416 280 A | 1/2006 |
| WO | WO-00/28756 | 5/2000 |
| WO | WO 00/28756 | 5/2000 |
| WO | WO-03/060712 | 7/2003 |
| WO | WO-2004/114144 | 12/2004 |

* cited by examiner

METHOD FOR LOCATING COVERAGE GAPS IN WIRELESS COMMUNICATION SERVICES

BACKGROUND OF THE INVENTION

1. Field of the Invention

The present invention relates to geographical coverage of wireless communication services. In particular, the present invention relates to a method for creating a map charting availability of wireless services and from which to identify coverage gaps.

2. Discussion of the Related Art

Access to a wireless communication system (e.g., a cellular telephone system) is typically provided by locating base stations of adequate capacity throughout the geographical service area. In a cellular telephone system[1], for example, after a mobile unit (e.g., a handset) registers with a base station, all communications to and from the mobile unit are conducted over a wireless link with that base station until either the mobile unit leaves the operating range of the base station, or the call is terminated. The call from the mobile unit may be a voice transmission, a data transmission, or both. In the registration process, the mobile unit and the base station exchange identification information. The mobile unit's identification information is sent by a backhaul network to a control center of the wireless communicate system for authentication. The authentication process verifies that the mobile unit is authorized to use the base station, either as a subscriber of the carrier operating the wireless communication system ("host carrier"), or as a subscriber of another carrier having a roaming agreement with the host carrier. The control station typically tracks the mobile unit as the mobile unit moves from within the range of one base station into the range of another base station.

[1] Examples of cellular telephone systems to which the present invention is applicable include CPDD, GSM, iDen, CDMA, GPRS, EDGE, and EvDO.

While communicating with a base station over a wireless link, a mobile unit typically monitors the quality of the wireless link. Examples of quality metrics of a wireless link include signal strength (e.g., signal-to-noise ratios) and bit error rates. The quality of the wireless link can vary with the distance of the mobile unit from the base station and is impacted by a variety of factors, such as the local weather conditions, topography of the surrounding area, and power of the cellular tower antenna. If the quality of the wireless link deteriorates below an acceptable level, or when another base station can provide a higher quality link—as when the mobile unit moves into the range of a closer base station—the registration of the mobile unit is transferred from the existing base station to the closer base station ("handed off") under control of the control center.

A coverage gap occurs at any position within the geographical service area when an acceptable quality wireless link cannot be established between a mobile unit and a base station from that position. When a mobile unit moves into a coverage gap while a call is in progress, the call is involuntarily terminated. Such a condition leads to user dissatisfaction and the carrier also loses revenue. Thus, carriers devote significant resources to search for and identify such coverage gaps. As coverage gaps often result from local conditions (e.g., existence of barriers causing signal shielding), coverage gaps are identified often only by sending technicians out to the field at considerable expense.

In recent years, global positioning system (GPS) technology has been widely used in mobile assets or resource management applications (e.g., automatic vehicle location (AVL) and fleet management applications for the trucking industry). FIG. 1 shows one example of a location-based information system suitable for such applications. As shown in FIG. 1, a mobile unit located within vehicle 10-1 uses a GPS receiver to determine vehicle 10-1's geographical position based on GPS positioning signals received from GPS satellites 2 within its line of sight. The geographical position and selected operational parameters of the vehicle (e.g., fuel level, velocity, engine temperature, time since last engine ignition) are transmitted to a database managed by service computer 6. The transmission to the database can be via a wireless link over wireless communication network 8 or via another communication channel. Service computer 6 may be, for example, a server on the Internet. In this example, wireless communication network 8 may be connected to the Internet through a network gateway, as is familiar to those skilled in the art. Service computer 6 may include an interface to allow other users (e.g., fleet managers in the back office) to access its database from anywhere on the Internet.

Typically, vehicle 10-1 does not transmit its position and operational data continuously, but upon the occurrence of specified events (e.g., engine ignition, engine shut-off, and idling time exceeding a predetermined time interval), on demand by the mobile unit operator, or at predetermined time intervals. Between transmissions, vehicle 3 accumulates the data in a local storage device, such as a volatile or non-volatile memory device. However, if the mobile unit moves into a coverage gap of the wireless communication system at the time transmission is required, the transmission must be postponed until a wireless link is available at a later time. Such an event is often also required to be logged by the mobile unit and reported at the later time when transmission is possible.

SUMMARY

The present invention takes advantage of data collected by mobile units in a location-based mobile resource management system to provide a method whereby coverage gaps in a wireless communication system can be identified and mapped using statistical and quantitative data analysis techniques.

According to one embodiment of the present invention, a method for determining coverage gaps within a geographical area served by a wireless communication network includes: (a) receiving a location report from each of a number of mobile units, (b) storing all the location reports received from the mobile units in a database, and (c) searching the database for a position within the geographical area based upon various criteria. In one embodiment, the location report includes a measured signal quality metric of the wireless link, which may be the signal strength of the wireless link, a bit error rate of the wireless link, or both. Statistical technique and quantitative techniques can be applied on the signal quality metrics reported. In addition, the database may be searched to locate positions at which location reports from any of the mobile units have not been received, to locate positions at which location reports from some but not all mobile units have been received, or to locate positions having weak signal strength.

In one embodiment, each location report includes a current location of the mobile unit at the time of establishing the wireless link. Alternatively, each location report includes a number of locations of the mobile unit collected over a predetermined time interval, and the most recent location collected is adopted as the current location at the time the location report was transmitted.

Each location report may identify the base station with which the mobile unit established the wireless link, and the searching may be limited to location reports transmitted over wireless links established with a specific base station. Similarly, the location report may identify a carrier that provides the wireless link, and the searching may be limited to location reports transmitted over wireless links provided by a specific carrier.

In one embodiment, a coverage gap may be visually identified from a map showing instances of locations from which location reports have been transmitted and where an unsuccessful attempt was made to establish a wireless link. Alternatively, the geographical service area may be divided into grids and identification can be performed automatically. In yet other embodiments, a coverage map can visually indicate reported criteria, such as, e.g., signal strength, number of successful and/or unsuccessful wireless links, or bit error rates, in order to show gradations of coverage gaps. This visual indication can use, e.g., different colors, patterns, or symbols on the display to indicate the reported criteria.

The present invention can be provided in a mobile resource management system accessible over the Internet. The wireless communication network may be interfaced to the Internet through a wireless network gateway.

The present invention is not limited only to mapping coverage of a cellular telephone communication network, but is applicable to other wireless services.

The present invention is better understood upon consideration of the detailed description below and the accompanying drawings.

DETAILED DESCRIPTION OF THE PREFERRED EMBODIMENTS

The present invention may be provided in a mobile resource management system, such as that described in the specification of U.S. Pat. No. 6,594,576, entitled "Using Location Data to Determine Traffic Information," filed Jul. 3, 2001 and issued on Jul. 15, 2003. To provide background of such a mobile resource management system, the specification of U.S. Pat. No. 6,594,576 is hereby incorporated by reference in its entirety.

Figure 2:
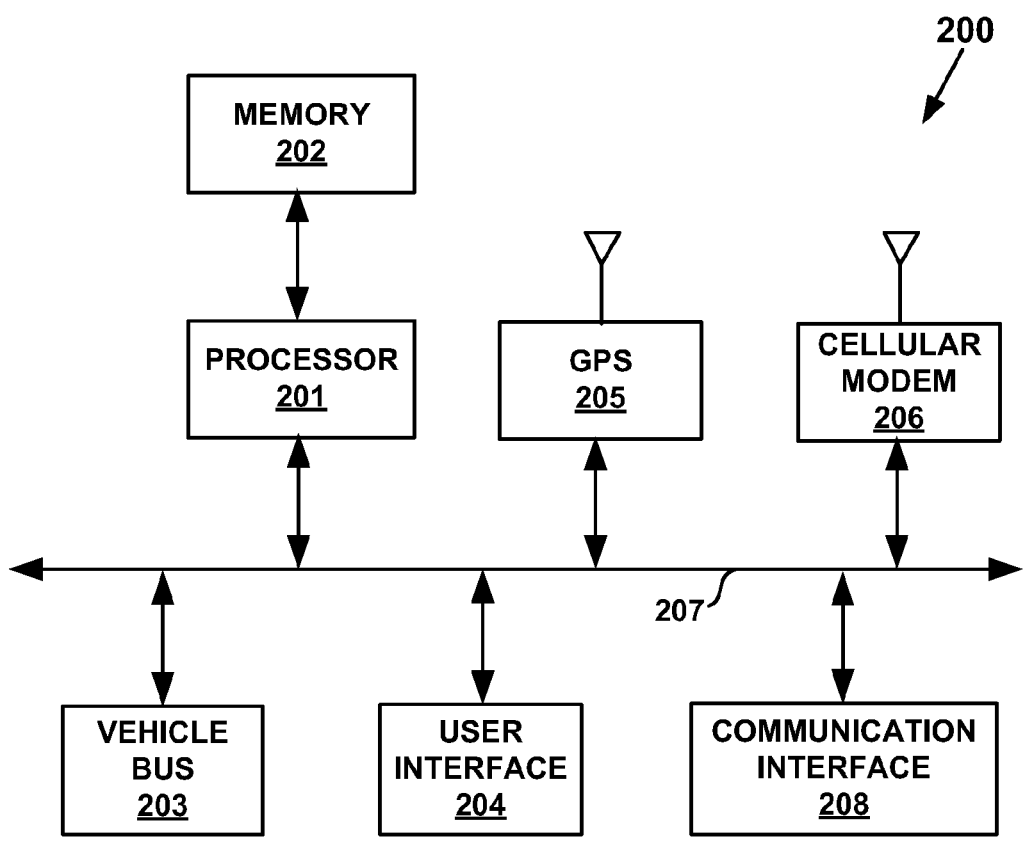
FIG. 2 is a block diagram of monitor unit 200 suitable for carrying out the present invention in accordance with one embodiment of the present invention.

FIG. 2 shows, in accordance with one embodiment of the present invention, location monitor unit 200 installed on each vehicle in the mobile resource management system. As shown in FIG. 2, monitor unit 200 includes GPS receiver 205, memory system 202, wireless communication interface (e.g., digital cellular telephone system interface) 206, under control of processor 201. GPS receiver 205 receives GPS satellite signals through an antenna (not shown) from GPS satellites in the line of sight of the monitor unit 200. Processor 201 processes the GPS signals to determine a current position for monitor unit 200. In other embodiments, the server can process the GPS signals to determine the current position. As mentioned above, wireless communication interface 206 may interface with any wireless communication system, such as, e.g., a digital cellular telephone network implementing, for example, transport control protocol/internet protocol (TCP/IP), or user datagram protocol/internet protocol (UDP/IP).

In some embodiments, a user interface 204 and vehicular bus interface 203 may also be provided. Monitor unit 200 can access values of vehicle operational parameters collected by various sensors over an industry standard vehicular bus[2] through vehicular bus interface 203. User interface 204 may include an LCD display and a keypad, for displaying text or graphical information and for receiving commands from the vehicle operator.

[2] Examples of a vehicular bus includes any of the standard vehicular bus promulgated by the Society of Automotive Engineers (SAE)

Figure 1:
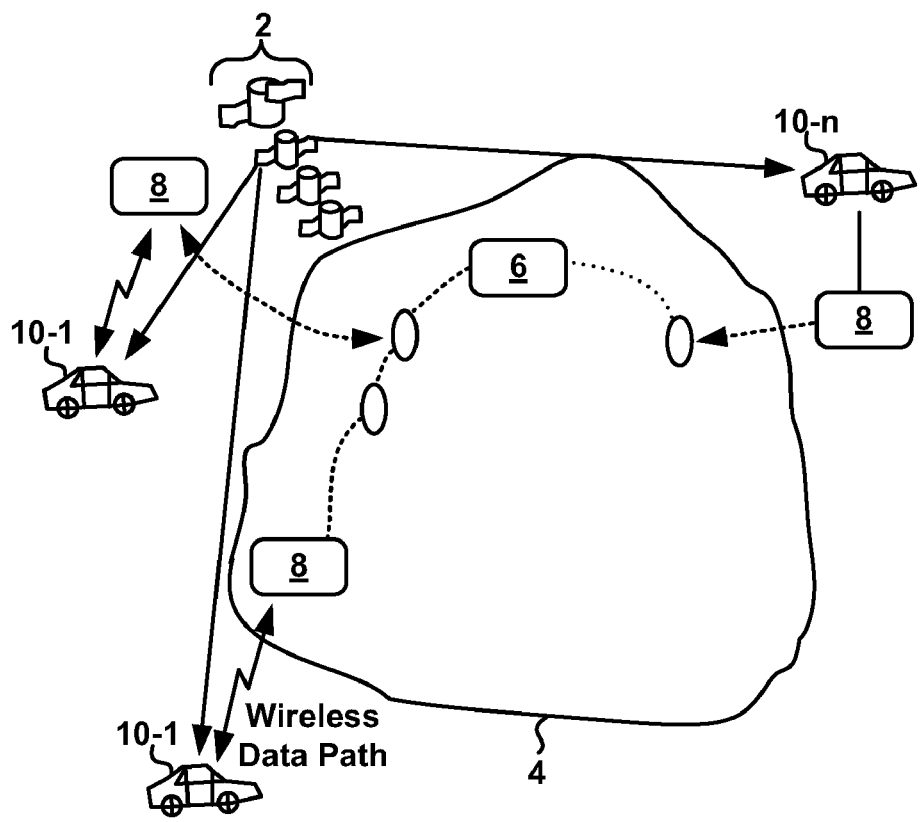
FIG. 1 shows an information system incorporating GPS technology accessible over a wireless link.

In this embodiment, monitor unit 200 processes the GPS signals and determines the mobile unit's position at regular intervals (e.g., every ten seconds) and accumulates the position data in memory 202 until a specified time for transmitting data to the service computer (e.g., service computer 6 of FIG. 1). Transmission time can be specified to be on a periodic basis, such as, e.g., every 15 minutes, at the time of engine ignition, or at user request. At transmission time, a wireless connection to a wireless communication network (e.g., wireless communication network 8) is attempted. If a wireless communication link is established, the quality of the wireless link thus established may be recorded in memory 202. If a wireless link cannot be established, the event of a failure to connect and the time of occurrence may also be recorded in memory 202. In the transmission, in addition to the position and operational parameters, the quality of the wireless link and identification of the communicating base station of wireless network 8 may also be included.

In another embodiment, a second communication interface 208 is provided for transmitting information regarding the quality of the wireless communication network 8 to service computer 6. In this embodiment, the monitor unit 200 records the quality of the wireless link using cellular modem 206 and transmits location reports via communication interface 208 using another type of communication protocol, such as, e.g., a WiFi wireless network, 802.11 local area wireless network, Bluetooth, or other wireless network. Due to the relatively high cost of transmitting data using a cellular network, it may be desirable to use a communication interface separate from the cellular interface to transmit the location reports to service computer 6. In yet another embodiment, the communication interface 208 comprises a wired interface, such as a serial or USB port. Here, the information regarding the quality of the wireless link is stored in memory 202 until the monitor unit 200 is later coupled to a docking station or other data transfer device for transferring the data from memory 202 to service computer 6.

Figure 3:
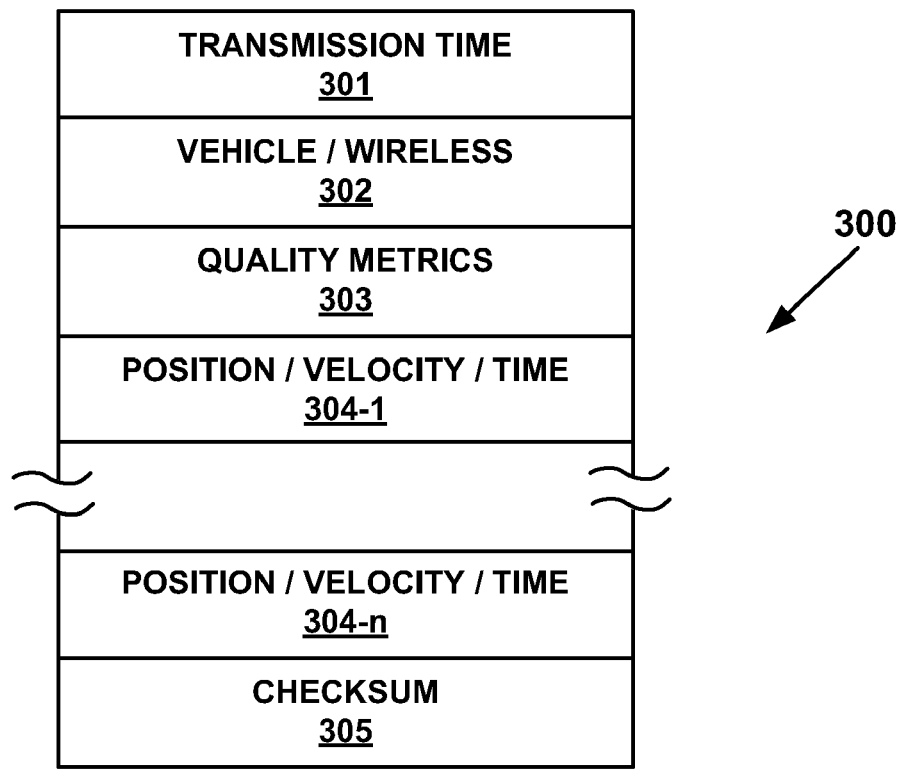
FIG. 3 shows an example of payload 300 of a transmission to service computer 6, in accordance with one embodiment of the present invention.

One example of payload 300 of a transmission ("location update report") to service computer 6 is shown in FIG. 3. As shown in FIG. 3, payload 300 of the location update report includes transmission time and location 301, vehicle and wireless network link identification information 302, wireless link quality metrics 303, numerous positional and operational parameter records 304, and checksum 305. Transmission time and location 301 identifies the date, time and, optionally, the most recently determined location at which the transmission is made. Vehicle and wireless link identification information 302 identifies the vehicle providing the location update report, the base station receiving the transmission and any other parameter values that serve to identify, for example, the nature of the wireless link (e.g., CDPD, CDMA, GSM, GPRS, EDGE, or EvDO), or the carrier. Link quality metrics 303 may include, for example, the signal strength detected at the time of the transmission and the bit error rate detected. As discussed above, signal strength may be represented by a signal-to-noise ratio, or any other suitable metric. Position and operational parameter records include all position and operational information of interest collected by the mobile resource management system from monitor unit 200. Typical position and operational information may include, for example, current locations, the time of each location determination, and the velocity of the vehicle at the time of each location determination. In addition, events relating to a failure to establish a wireless link may also be reported. Checksum 305 includes error detection or error correction information provided to ensure data integrity, which may be values of "syndromes" used in any of numerous error correction or detection techniques known to those skilled in the art.

Figure 4:
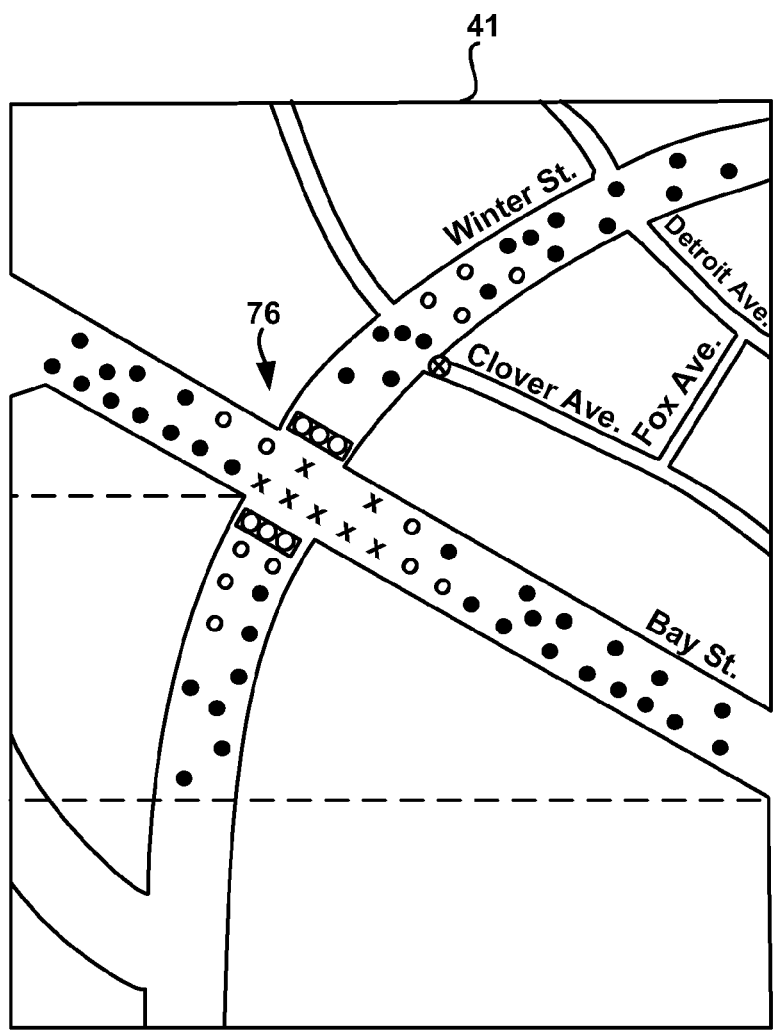
FIG. 4 shows map 41 displaying instances of location update reports received at service computer 6 from mobile units traveling through a given geographical area, accumulated over a sufficiently long period of time in accordance with one embodiment of the present invention.
Figure 5:
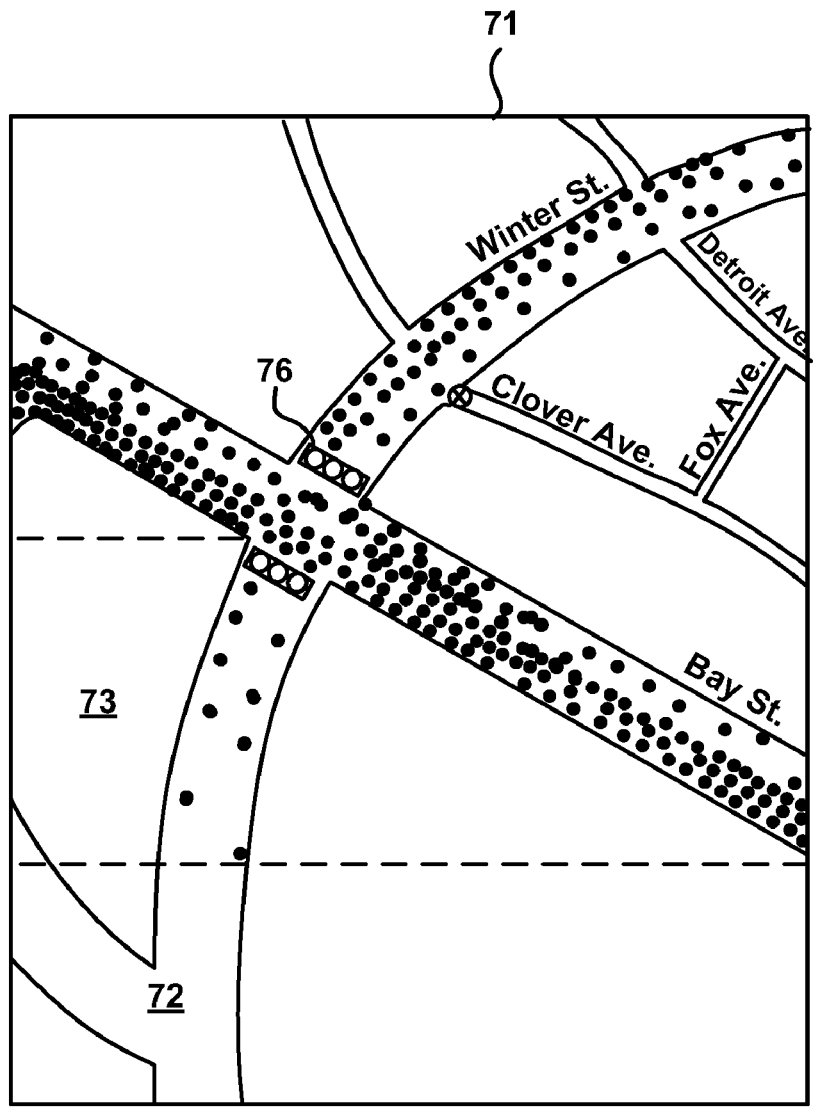
FIG. 5 shows map 71 displaying instances of location update reports received at service computer 6 from mobile units traveling through a given geographical area, accumulated over a sufficiently long period of time in accordance with another embodiment of the present invention.

The location update reports from all reporting vehicles of the mobile resource management system are stored in a database at service computer 6. Accumulated over a sufficiently long period of time (e.g., a week), the instances of location update reports received at service computer 6 from vehicles traveling through a given geographical area can be displayed in map. Exemplary maps 41 and 71 are shown in FIGS. 4-5. As shown in FIGS. 4-5, maps 41, 71 cover a geographical area including intersection 76 of Winter Street and Bay Street.

The information regarding the wireless communication network may be displayed in a variety of ways. For instance, each location for which a location report has been received is displayed on the map using a symbol which indicates a metric being measured. For example, different color dots may be used to indicate the strength of the wireless signal received at that location, with green indicating a full strength signal, red indicating no signal received, and other colors and/or shades to indicate different signal levels. In yet other embodiments different symbols may be used to indicate different types of information regarding the wireless signal. A user viewing the map showing the location reports can quickly and easily determine where cellular coverage gaps may exist.

In FIG. 4, map 41 shows each location reports as a cross ("X"), an open circle ("○"), or a darkened circle ("●"). The cross indicates that no wireless signal was received. An open circle indicates that a wireless signal was received, but was of an unacceptable quality (i.e., signal strength below a minimum acceptable threshold level). A darkened circle indicates that an acceptable signal was received.

FIG. 5 shows another embodiment in which location reports are only transmitted when a satisfactory wireless signal is detected. In map 71, each dot shown along Winter and Bay Streets represent an instance of a location update report, placed according to the location from which the location update report was transmitted. (If the transmission time and location 301 field of the location update report does not include a transmission location, the most recent location from the position and operational parameter record in the location update report may be used). As shown in FIG. 5, transmissions were made along the full length of the section of Bay Street shown, indicating that wireless access is available throughout that section of Bay Street. In contrast, the density of instances of location update reports from the section of Winter Street in region 73 appears to be substantially less than the density of instances reported from Bay Street or from the portion of Winter Street north of intersection 76. The lesser density suggests that the signal quality of wireless links in that region may be poorer. Similarly, as no instance of a location update report was received from the portion of Winter Street in the region indicated by reference numeral 72, that region may possibly indicate a coverage gap for the wireless network.

Of course, if the events relating to failures to establish a wireless link are reported, such events can be displayed on map 71 in the same manner, and coverage gaps can be identified directly.

If the region covered by map 71 is served by multiple base stations, or by multiple carriers, the instances of location update reports can be filtered to include only a specified set of base stations or a specified set of carriers, thus allowing identification of coverage gaps specific to the included base stations or carriers. The location update reports may be also filtered to include only location update report instances for specified time periods. This technique allows the user to determine temporal or seasonal variations in coverage. When combined with information derived from local weather reports, availability of coverage under extraordinary weather conditions (e.g., a thunder storm) can be determined. If signal quality metrics are included, quantitative analysis or statistical techniques may be applied to further identify weak spots in the coverage, or to more efficiently determine placement of base stations or to plan capacity for the base stations required. Also, a "relief map" indicating the measured signal strengths, or the distribution of error bit rates can also be created showing the signal qualities for received location update reports at each vicinity.

In some embodiments, the coverage map data may be combined with a database of known construction/repair sites to produce an overlay map comparing signal strength with proximity to infrastructure under repair. Alternatively, the coverage map data can be combined with a database of locations and/or addresses of points of interest to estimate coverage based on proximity to a point of interest. For example, a user can select a radius around a point of interest and view a map showing the estimated coverage area within that radius.

The above detailed description is provided to illustrate the specific embodiments of the present invention and is not intended to be limiting. Numerous variations and modifications within the scope of the present invention is possible. For example, in embodiments described above, the mobile units are implemented as location monitor units 200 installed in various vehicles, such as a automobile or truck. In other embodiments, the mobile units may be implemented as a location-enabled wireless devices, such as, e.g., a GPS-enabled cellular phone, personal digital assistant (PDA), or laptop. The GPS receiver may be incorporated into the cellular phone or may be part of a separate device coupled with phone. These devices may be transported within a vehicle, or may be carried by a user on foot. The present invention is set forth in the following claims.

We claim:

1. A method for determining coverage gaps within a geographical area served by a wireless communication network, comprising:

at a mobile unit within said geographical area:
determining a location of said mobile unit via satellite positioning signals;
determining a quality metric of a wireless link corresponding to said location of said mobile unit, wherein said wireless link is a cellular wireless link; and
transmitting a location report to a service computer from said mobile unit via a non-cellular communications link from said mobile unit, wherein said location report comprises said quality metric of said wireless link and said location of said mobile unit corresponding to said quality metric; and at said service computer:
receiving said location report along with a plurality of said location reports from each of a plurality of mobile units, wherein each of the received location reports comprises said quality metric of said wireless link as measured by the sending mobile unit and a location of said sending mobile unit corresponding to the quality metric;
compiling data from said location reports; and
identifying a position of weak signal quality within the geographical area based on said compiled data.

2. A method as in claim 1, wherein each of the location reports includes an operational parameter record comprising an operational parameter collected by a sensor coupled with a vehicular bus.

3. A method as in claim 1, wherein the quality metric identifies a signal strength of the wireless link.

4. A method as in claim 1, wherein the quality metric comprises a bit error rate of the wireless link.

5. A method as in claim 1, further comprising:
applying a statistical technique to determine a signal quality of the wireless links on which the location reports were received.

6. A method as in claim 1, wherein each of the location reports is produced by a mobile resource management system coupled with a vehicular bus.

7. A method as in claim 1, wherein the location reports identify location information associated with the mobile unit accumulated over a time period prior to when the wireless link is established.

8. A method as in claim 1, wherein the location reports identify a base station with which the mobile unit established the wireless link.

9. A method as in claim 8, wherein the compiling is limited to location reports transmitted over wireless links established with the base station.

10. A method as in claim 1, wherein the location reports identify a carrier that provides the wireless link.

11. A method as in claim 10, wherein the compiling is limited to location reports transmitted over wireless links provided by the carrier.

12. A method as in claim 1, wherein positions associated with the location reports are displayed on a map, and wherein the compiling involves visually identifying locations from which location reports have not been received.

13. A method as in claim 1, wherein positions associated with the location reports are displayed on a map, and wherein the compiling involves visually identifying locations from which an acceptable quality wireless signal has not been received.

14. A method as in claim 1, wherein the wireless communication network is coupled with the Internet.

15. A method as in claim 14, further comprising:
storing the location reports in a database located at a server on the Internet, and wherein the wireless communication network interfaces with the Internet through a wireless network gateway.

16. A method as in claim 1, wherein the mobile unit is an asset managed under a mobile resource management system.

17. A method as in claim 1, wherein the location reports are received over a wireless link.

18. A method for determining coverage gaps within a geographical area served by a wireless communication network, comprising:
at a mobile unit within said geographical area:
determining a location of said mobile unit via satellite positioning signals;
determining a quality metric of a wireless link corresponding to said location of said mobile unit, wherein said wireless link is a cellular wireless link; and
transmitting a location report to a service computer from said mobile unit via a non-cellular communications link from said mobile unit, wherein said location report comprises said quality metric of said wireless link and said location of said mobile unit corresponding to said quality metric; and
at said service computer:
receiving said location report along with a plurality of said location reports from each of a plurality of mobile units, wherein each of the received location reports comprises said quality metric of said wireless link as measured by the sending mobile unit and a location of said sending mobile unit corresponding to the quality metric;
storing the location reports in a database; and
generating a coverage map displaying information from the location reports.

19. A method as in claim 18, wherein the location reports comprise an operational parameter record containing an operational parameter collected by a sensor coupled with a vehicular bus.

20. A method as in claim 18, wherein the quality metric identifies a signal strength of the wireless link.

21. A method as in claim 18, wherein the quality metric comprises a bit error rate of the wireless link.

22. A method as in claim 18, wherein the generating the coverage map involves applying a statistical technique to determine a signal quality of the wireless link.

23. A method as in claim 18, wherein the location reports are produced by a mobile resource management system coupled with a vehicular bus.

24. A method as in claim 18, wherein the location reports identify location information associated with the mobile unit accumulated over a time period prior to when the wireless link is established.

25. A method as in claim 18, wherein the location reports identify a base station with which the mobile unit established the wireless link.

26. A method as in claim 25, wherein the generating the coverage map is limited to location reports transmitted over wireless links established with the base station.

27. A method as in claim 18, wherein the location reports identify a carrier that provides the wireless link.

28. A method as in claim 27, wherein the generating the coverage map is limited to location reports transmitted over wireless links provided by the carrier.

29. A method as in claim 18, wherein said generating the coverage map comprises displaying on the coverage map positions at which location reports are received and visually identifying locations from which location reports have not been received.

30. A method as in claim 18, wherein said generating the coverage map comprises displaying on the coverage map positions at which location reports are received and visually identifying locations from which an acceptable quality wireless signal has not been received.

31. A method as in claim 18, wherein the wireless communication network is coupled with the Internet.

32. A method as in claim 31, wherein the database is located at a server on the Internet and wherein the wireless communication network interfaces with the Internet through a wireless network gateway.

33. A method as in claim 18, wherein the mobile unit is an asset managed under a mobile resource management system.

34. A method as in claim 18, wherein said generating the coverage map comprises displaying coverage quality for a region on the coverage map.

35. A method as in claim 18, wherein the location reports are received over a wireless link.

36. A method as in claim 1, wherein at least one of the location reports comprises a report of a failure to establish a wireless link.

37. A method as in claim 18, wherein at least one of the location reports comprises a report of a failure to establish a wireless link.

\* \* \* \* \*